(12) United States Patent
Aschwanden et al.

(10) Patent No.: US 7,920,330 B2
(45) Date of Patent: Apr. 5, 2011

(54) TUNABLE OPTICAL ACTIVE ELEMENTS

(75) Inventors: Manuel Aschwanden, Haldi (CH);
Markus Daniel Beck, Zürich (CH);
Yury Belyaev, Heidelberg (DE);
Andreas Stemmer, Muttenz (CH)

(73) Assignee: ETH Zürich, ETH Transfer, Zürich (CH)

( * ) Notice: Subject to any disclaimer, the term of this patent is extended or adjusted under 35 U.S.C. 154(b) by 111 days.

(21) Appl. No.: 12/223,742

(22) PCT Filed: Feb. 6, 2007

(86) PCT No.: PCT/EP2007/051138
§ 371 (c)(1),
(2), (4) Date: Jan. 21, 2009

(87) PCT Pub. No.: WO2007/090843
PCT Pub. Date: Aug. 16, 2007

(65) Prior Publication Data
US 2009/0310209 A1    Dec. 17, 2009

(30) Foreign Application Priority Data

Feb. 7, 2006   (EP) .................................... 06002411
Aug. 31, 2006  (EP) .................................... 06018194

(51) Int. Cl.
*G02B 1/06*        (2006.01)
(52) U.S. Cl. .......................... 359/665; 359/666; 359/667
(58) Field of Classification Search .................. 359/665, 359/666, 667, 642
See application file for complete search history.

(56) References Cited

U.S. PATENT DOCUMENTS

| 3,942,048 | A |   | 3/1976  | Laude et al. |         |
|-----------|---|---|---------|--------------|---------|
| 4,494,826 | A |   | 1/1985  | Smith        |         |
| 4,783,153 | A |   | 11/1988 | Kushibiki et al. |     |
| 4,802,746 | A | * | 2/1989  | Baba et al.  | 359/667 |
| 4,850,682 | A |   | 7/1989  | Gerritsen    |         |
| 5,355,252 | A | * | 10/1994 | Haraguchi    | 359/369 |
| 6,812,624 | B1|   | 11/2004 | Pei et al.   |         |

(Continued)

FOREIGN PATENT DOCUMENTS

EP     0 147 373 B1     5/1987

(Continued)

OTHER PUBLICATIONS

A. Yasseen et al. "Diffraction Grating Scanners Using Polysilicon Micromotors" IEEE Journal of selected topics in quantum electronics, vol. 5, No. 1, Jan./Feb. 1999.

(Continued)

*Primary Examiner* — Timothy J Thompson
(74) *Attorney, Agent, or Firm* — Pauley Petersen & Erickson

(57) ABSTRACT

The invention is directed to different optical active elements (1, 20, 22) such as tunable diffraction gratings and tunable phase shifters having in general a similar setup. The optical active elements (1, 20, 22) comprise an intermediate layer (4) made out of a deformable material which is mechanically interconnected to a driving means. The driving means comprises a first and a second driving plate (2, 3) arranged in general opposite to each other on opposite sides of and at least partially covering the intermediate layer (4) such that a local compression of the intermediate layer (4) by the driving plates (2, 3) causes a local reduction of the thickness in a first direction. This reduction in a first direction causes a secondary deformation of the intermediate layer in a second direction which results in a change of the optical behavior of the optical active element.

22 Claims, 8 Drawing Sheets

U.S. PATENT DOCUMENTS

| | | | |
|---|---|---|---|
| 6,903,872 B2 | 6/2005 | Schrader | |
| 6,930,817 B2 | 8/2005 | Srinivasan et al. | |
| 7,002,737 B1 * | 2/2006 | Akiyama et al. | 359/368 |
| 7,311,398 B2 * | 12/2007 | Kuiper et al. | 351/161 |
| 7,435,495 B2 * | 10/2008 | DeSimone et al. | 429/442 |
| 7,755,840 B2 * | 7/2010 | Batchko et al. | 359/665 |
| 2002/0186928 A1 | 12/2002 | Curtis | |
| 2004/0008853 A1 | 1/2004 | Pelrine et al. | |
| 2004/0109234 A1 | 6/2004 | Levola | |

FOREIGN PATENT DOCUMENTS

| | | |
|---|---|---|
| EP | 1 471 373 A2 | 10/2004 |
| WO | WO 99/48197 A2 | 9/1999 |
| WO | WO 2005/085930 A1 | 9/2005 |

OTHER PUBLICATIONS

B.A. Gryzbowski et al. "Thermally actuated interferometric sensors based on the thermal expansion of transparent elastomeric media" Review of Scientific Inst. vol. 70, No. 4, Apr. 1999.

B.A. Gryzbowski et al. "Beam redirection and frequency filtering with transparent elastomeric diffractive elements" Applied Optics, vol. 38, No. 14, May 10, 1999.

Ron Pelrine et al. "Applications of Dielectric Elastomer Actuators" Smart Structures and Materials 2001: Electroactive Polymer Actuators and Devices, vol. 4329 (2001).

Co-Pending U.S. Appl. No. 12/223,743, Tunable Diffraction Grating, filed Aug. 7, 2008.

* cited by examiner

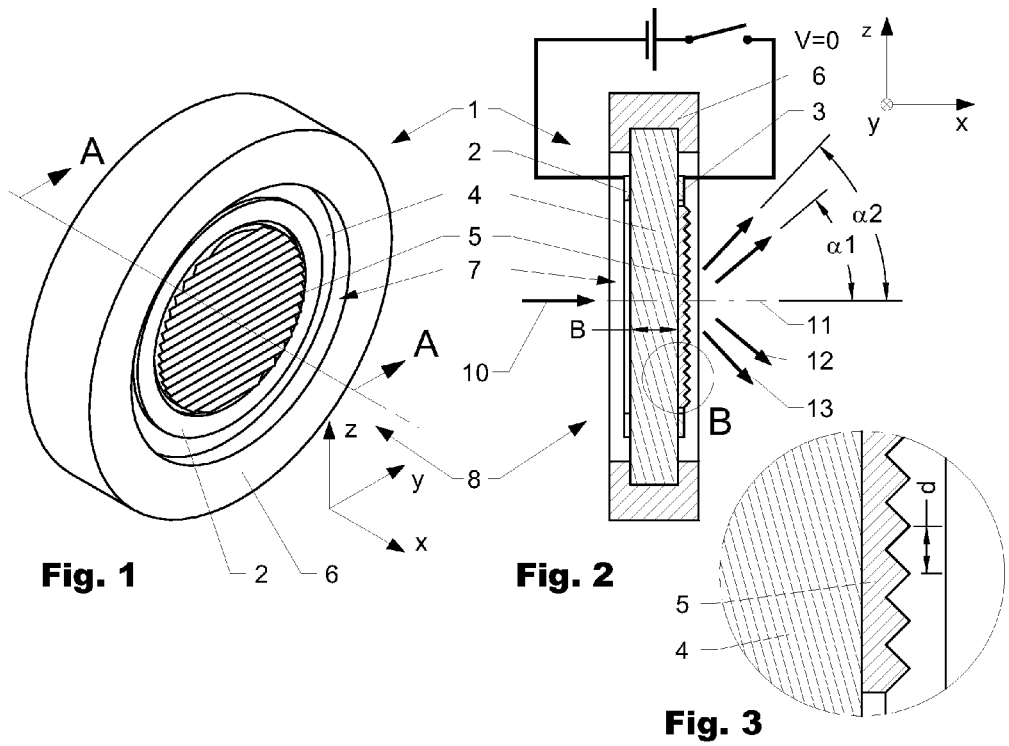
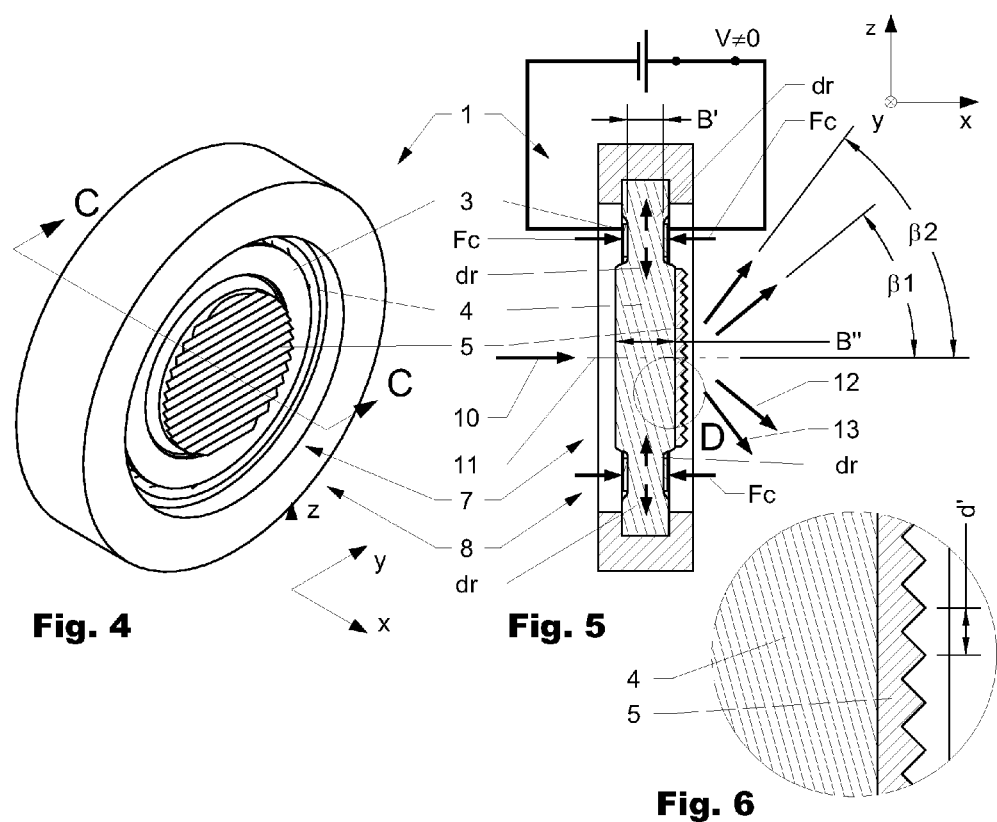

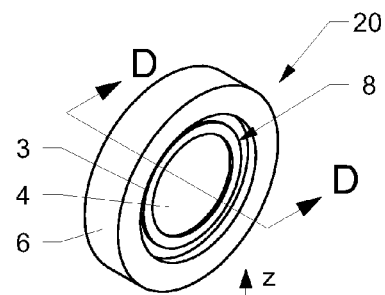
Fig. 8
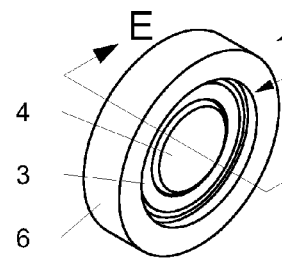
Fig. 10
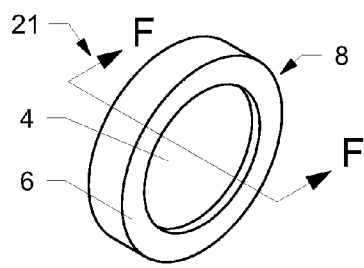
Fig. 12
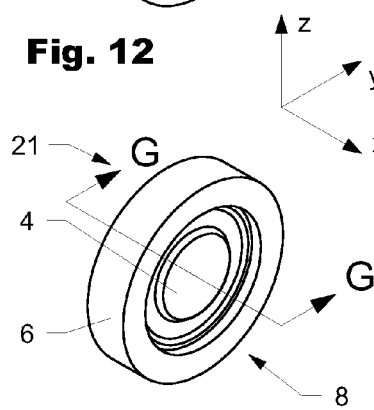
Fig. 14
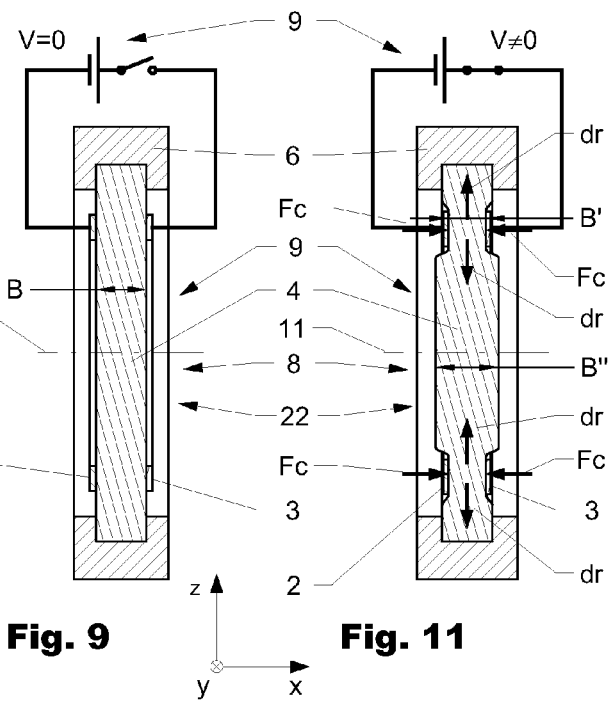
Fig. 9    Fig. 11
Fig. 13    Fig. 15

TUNABLE OPTICAL ACTIVE ELEMENTS

FIELD OF THE INVENTION

The invention lies in the field of tunable optical active elements such as phase shifters and transmission gratings, e.g. for adaptive optics and microscopy.

BACKGROUND OF THE INVENTION

A diffraction grating is an optical element that consists of a reflecting or transparent substrate whose surface contains fine grooves or rulings that are equally spaced. When light is incident on a diffraction grating, diffractive and mutual interference effects occur and light is reflected or transmitted in discrete directions called orders. Because of their dispersive properties, gratings are commonly used in monochromators and spectrometers. These devices were first manufactured by German physicist Joseph von Fraunhofer in 1821.

Diffraction gratings have been a research topic for many decades. At the beginning, the design and the functional principle of the gratings were of major interest. In recent years, tunable diffraction gratings became popular, which allow to modify their physical behavior. One of the major topics was how a large tuning range could be achieved. The intense research activities combined with new micromachining technologies resulted in several types of tunable diffraction gratings. Examples of these tunable diffraction gratings are different realizations of mechanically rotary gratings or tunable gratings based on comb drives (see A. Azzam Yasseen et al. "Diffraction Grating Scanners Using Polysilicon Micro-motors", IEEE Journal of selected topics in quantum electronics, Vol. 5, No. 1, January/February 1999). Although some of these gratings are employed in commercially successful products, they are often limited in their tuning range or require many expensive production steps.

Classical diffraction gratings are normally based on non-deformable rigid materials. These materials make it impossible to change the shape of the gratings. Therefore the only possibility to tune these gratings is rotation. As state of the art solutions show, the rotation of gratings involves expensive mechanical systems that are difficult to implement in a micro system. In recent years this problem was addressed and several attempts to solve it were undertaken. Tunable diffraction gratings based on comb drives or piezoelectric actuators were developed. Such devices require either high investments due to complicated production processes or achieve only relatively small tuning ranges. This is mainly due to the stiff materials that are used for the implementation of the grating.

Tunable diffraction gratings are known from prior art. One example of such a device is a diffraction grating which is based on polymer substrates (i.e. PDMS) and which changes its shape due to thermal expansion (see Bartosz A. Grzybowski et al., "Thermally actuated interferometric sensors based on the thermal expansion of transparent elastomeric media", Review of Scientific Instruments, Vol. 70, No. 4, April 1999). The same researchers have developed another tunable diffraction grating, which is tuned by the application of an external mechanical pressure (see Bartosz A. Grzybowski et al., "Beam redirection and frequency filtering with transparent elastomeric diffractive elements", Applied Optics, Vol. 38, No. 14, 10 May 1999). The mechanical pressure is applied to a layer of polymer comprising a diffraction grating by two parallel glass plates.

Due to the function principle both solutions have the disadvantage that it is e.g. not possible to miniaturize them.

US2004/0109234 (US'234), by Tapani Levola, was published in 2004 and relates to an optical device for manipulating a light wave using a diffractive grating structure which is electrically deformable. The electrically tunable diffraction grating is based on the physical effect that at an interface of two materials with different dielectric constants a force occurs in the presence of an electric field. This effect is suggested to be used to tune the diffractive behavior of the grating.

US2002/0186928 (US'928), resp. EP147373, by Curtis Kevin, was published in 2002 and describes a tunable optical device for adding or dropping one or more channels in a wavelength division multiplexing communication system. The tunable optical device comprises one or more filters, wherein at least one filter comprises at least one elastomer and one or more gratings. The elastomer is a polymer that expands and contracts with a change in a voltage applied across the polymer or when a certain wavelength of light is diffracted from or transmitted through the polymer. This device consists of a holographic grating that is based on an alternating refractive index pattern. This grating is embodied within an elastomer that changes its thickness when a voltage is applied. One disadvantage is that the grating is based on a fixed pattern of alternating refractive indices.

U.S. Pat. No. 6,930,817 (US'817), by Srinivasan et al., was published in 2004 and discloses a variable modulator assembly which includes an active layer with a multiplicity of electrodes. A deformable layer is in operational contact to a first surface of the active layer. An electrode configuration with a plurality of electrodes is in operational contact to a second surface of the active layer. A controller is configured to selectively apply a variable signal to the selected electrodes of the electrode configuration. Application of the variable signal causes the deformable layer to reconfigure to an alternated shape having distinct peaks and valleys. The distance between the peaks and valleys being determined by the value of the applied variable signal. In an optical modulating method, a variable modulator assembly is positioned to receive light at the deformable layer from a light source. Activation of an electrode configuration by the controller generates a variable signal, causing electrostatic charges to distort the deformable layer into a pattern corresponding to the activated electrodes.

U.S. Pat. No. 6,903,872 (US'872), by Schrader, was published in 2002 and describes an electrically reconfigurable optical device based on the use of a layer of dielectric and transparent viscoelastic material opposing at least a first electrode structure. According to the invention the arrangement of the individual electrode zones in the first electrode structure in order to deform the viscoelastic layer complies with one of the following alternatives. According to the first alternative, the electrode zones of the first electrode structure are grouped into groups composed of two or more adjacent electrode zones and within each of said groups individual electrode zones are supplied each with a substantially different voltage. According to the second alternative, the electrode zones of the first electrode structure are substantially annular, elliptical, rectangular or polygonal closed-loop electrodes. The invention allows, for example, for creating electrically reconfigurable blazed gratings or Fresnel zone lenses.

U.S. Pat. No. 3,942,048 (US'048), by Laude et al., was published in 1976 and is directed to an optical grating assembly which comprises a piezo-electric substrate. The piezo electric substrate supports on two opposite faces metallic layers. One of these faces of the substrate also carries a grating either formed in that face, in the metal layer supported by that face, or in a resin layer carried by that face. Application of a variable voltage between the metal layers sets up an electric field of variable strength in the substrate and this results in the pitch of the grating being variable due to the piezo-electric nature of the substrate. Due to the fact that this grating relies on the piezo electric effect of the substrate only limited pitch variation is possible and therefore no large tuning range results. A further difficulty consists in that the making of such a device is relatively expensive.

U.S. Pat. No. 4,850,682 (US'682), by Gerritsen, was published in 1989 and describes a diffraction grating. The diffraction grating responds to radiation incident thereon within a given range of incidence angles and redirects the incident radiation from the structure in a selected direction within relatively limited confines. A liquid crystal material is positioned in contact with the diffracting surface of at least one diffraction structure. When inactivated, the liquid crystal material has a refractive index which is substantially the same as that of the diffraction structure. When activated the refractive index of the liquid crystal material is substantially different whereby incoming radiation within a given range of incidence angles is transmitted through the structure and exits in the selected direction.

WO9948197 (WO'197), of Trex Communications Corp., was published in 1999 and describes a piezoelectric substrate having an attached or integrally formed diffraction grating. When an electric field is applied to the piezoelectric substrate parallel to the grating, the piezoelectric actuator stretches the grating such that the periodicity and the angle of diffraction changes. One problem consists in that the electrodes are arranged lateral to the grating. Thereby it becomes not possible to miniaturize the device.

WO2005085930 (WO'930), of Siemens Aktiengesellschaft, was published in 2005 and is directed to an adaptive optical element which can be configured e.g. as a biconvex lens. The element has a polymer actuator which is constituted of an electroactive polymer layer and several lateral layer electrodes. The layer electrodes are exposed to different voltages, thereby producing a gradient in the field strength of the electric field influencing the deformation of the polymer layer. It is described that it would be possible to achieve almost any state of deformation such as e.g. the depicted biconvex lens. However, the lens does not seem to be very accurate.

In WO'930 reference is made to an article published in "Smart structures and materials 2001", Vol. 4329 which describes a membrane actuator comprising an electroactive polymer which is arranged within an opening of a circular frame. In that a voltage is applied to electrodes arranged on opposite sided of the membrane the surface of the membrane can be modified. Due to the reason that the membrane is attached in a slack manner in the frame the membrane starts to sag when it's surface is increased due to a voltage applied. Thereby it is possible to take influence on a beam traveling through the membrane.

The above mentioned prior art devices are not only expensive in production but also have the disadvantage of not being practical in the transmission mode. However, the device known from US'928 could be used as a transmission grating in certain applications but only as a wavelength filter and not as a light steering device.

SUMMARY OF THE INVENTION

The present invention is directed to a method and a device of optical active elements, e.g. such as tunable diffraction gratings, tunable light transmission phase shifters, tunable fresnel lenses or tunable lenses.

A fundamental property of gratings is that the angle of diffraction depends on the wavelength of the incident light and period of grating (as shown below). Therefore, a grating spatially separates an incident light into its monochromatic components, i.e. it is dispersive, producing a rainbow of colors under white light illumination. This is visually similar to the operation of a prism, although the mechanism is different. The principle of diffraction is known for more than 100 years and there exist many commercially available diffractive elements (e.g. Zeiss, Thorlabs, Edmund Optics).

Classical diffraction gratings are mostly based on non-deformable materials. Therefore the periodic structure that is imprinted during the production can not be changed. Thus, according to the grating equation $$n \cdot \sin(\Theta_m) - n_i \cdot \sin(\Theta_i) = \frac{m\lambda}{d}$$

these gratings can only be tuned by changing the angle of incidence $\Theta_i$. In the grating equation, $\Theta_m$ represents the angles of the m-th order of diffraction, $n_i$ is the incident medium's index of refraction, n is the index of refraction of the medium that the diffracted orders are propagating in, $\lambda$ denotes the wavelength of the incident light and d is the period of the grating. In difference to the prior art the herein disclosed invention provides a method and a device to change the period of the grating in simple and cost efficient manner as will be explained in more detail subsequent.

A further need in optics consists in optical elements which easily allow to shift the phase of e.g. a light beam. When light travels through a medium, its wavelength decreases inversely proportional to the refractive index of the medium $\lambda=\lambda_0/n$, wherein $\lambda$ represents the wavelength of light in the medium, $\lambda_0$ is the wavelength of the light in vacuum and n denotes the refractive index of the medium. When light travels a distance of l through a medium with refractive index n, a phase retardation of $\phi=2\pi(n-1)l/\lambda$ is introduced compared to a beam traveling in vacuum. If the thickness of the medium is changed by a value of $\Delta l$, the phase difference between the two beams changes by $\Delta\phi=2\pi(n-1)\Delta l/\lambda$. As it will become obvious from the subsequent explanations the herein disclosed invention provides a method and a device which allow to shift the phase of light in an easy and cost efficient manner.

First embodiments of a tunable diffraction grating and afterwards embodiments of a tunable light transmission phase shifter will be explained in more detail subsequently.

It has to be noted that the general setup of a tunable diffraction grating and embodiments with the reflective type of tunable diffraction gratings are described in the European Patent Application No. 06002411.1 of the same inventors and of which priority is claimed herein.

In general an optically active element according to the present invention, e.g. such as a tunable diffraction grating, in general comprises an actuator comprising translucent or non-translucent deformable intermediate layer, e.g. consisting out of elastomeric material, which is actuated by a driving means such that in a specific area of the actuator the lateral expansion and/or the thickness of the intermediate layer becomes adjustable. Depending on the filed of application the elastomeric intermediate layer may be arranged in a surrounding holding frame in a prestretched manner to improve the performance of the device. In an embodiment the driving means comprises a first and a second electrode acting as first and second driving plates which are in general arranged opposite to each other on opposite sides of the intermediate layer. The electrodes are arranged sufficiently electrically isolated with respect to each other to avoid negative flow of current. By applying a voltage between the first and the second electrode, the intermediate layer in the area between the first and the second electrode can be compressed by applying a voltage due to coulomb forces causing a local deformation (reduction of thickness) in a first direction and at least one thereto related secondary deformation (expansion) in a second lateral direction. In general the second deformation is related to the first deformation by the poisson's ratio of the material of the intermediate layer. In an embodiment a deformable grating is interconnected directly or indirectly to the deformable intermediate layer. The deformation of the diffraction grating is thereby in general related to the deformation of the intermediate layer, mainly to a deformation which is achieved due to the secondary lateral deformation related to a primary deformation via the poisson's ratio of the material. However, further deformations may be superimposed. In a further embodiment a grating is integrated in to a surface of the intermediate layer, e.g. by stamping, thermal deformation or molding. However, these embodiments have certain restrictions with respect to performance.

Optical elements such as diffraction gratings or fresnel lenses are usually characterized by their period (groove density) expressed in groove density or lines per millimeter. The dimension and period of the grooves must be in the order of the wavelength in question and the effect to be achieved. In optics where the use of gratings is most common, this typically corresponds to wave lengths between 380 nm and 780 nm (this is the visible light range, other ranges such as e.g. 10 nm to 10 µm are possible too). The groove density typically varies between a few tens of grooves per millimeter to a few thousands. The shape of the periodic structure (grooves) determines the efficiency of the grating. E.g. a grating can be formed by linear grooves which have a triangular cross section or consist of round spheres. Alternatively a grating can be formed by a regular pattern of spherical or pyramidal shapes. Other shapes e.g. for fresnel lenses are possible.

State of the art diffraction gratings experience several limitations. One major problem is the fact that the diffraction gratings are not continuously tunable without employing a complicated macroscopic rotation mechanism or expensive and complicated microscopic mechanical actuator. One reason is the use of hard materials (such as silicium) in standard tunable gratings. The stiffness of these materials makes it impossible to significantly change the grating period.

The current invention overcomes this problem by the help of comparably soft materials such as elastomers although the making of diffraction gratings based on soft materials is not an in general new idea. There are several reports available which describe how a grating can be tuned by using heat or external pressure (e.g. Bartosz A. Grzybowski et al., "Thermally actuated interferometric sensors based on the thermal expansion of transparent elastomeric media", Review of Scientific Instruments, Vol. 70, No. 4, April 1999 or Bartosz A. Grzybowski et al., "Beam redirection and frequency filtering with transparent elastomeric diffractive elements", Applied Optics, Vol. 38, No. 14, 10 May 1999).

However, from the prior art it is not known to tune a grating by using electroactive polymer actuators, especially elastomer actuators. Electrical tuning has significant advantages compared to presently known methods. Tuning by heating or cooling is very slow and difficult to control; tuning by external pressure is difficult to integrate in small devices.

The combination of diffraction gratings and piezo ceramics is also known from the prior art, but experiments have shown that such devices have only a limited optical tuning range. This is mainly due to the limited strain (<0.3%) that can be achieved with piezo-ceramics.

Incident white light which passes a transparent actuator and a grating area or which is shown onto a reflective or semi-transparent grating is split up in components of different radiation which are emitted at certain angles depending on the lateral deformation of the grating and the grating period. By a change of the grating period components of the light are emitted at different angles. When voltage is applied to electrodes, i.e. made out of carbon black, the deformable elastomeric material in between the electrodes is compressed due to coulomb forces. Due to the material's poisson ratio of i.e. 0.499, the compression in the first direction results in a planar expansion in a second direction. This lateral expansion of the electrode area causes a grating area that is mechanically interconnected to the prestrained polymer to contract in planar direction. This contraction (compression) results into a grating period change that causes the angle of the $m^{th}$-order diffraction to increase. In an example given wherein the deformable material consists out of elastomeric material, the change of the diffraction angle for a wavelength of 532 nm is between 20 mrad and more than 100 mrad.

In an embodiment of the invention the actuator and if appropriate the grating are implemented in at least one deformable material. One advantage of such an implementation is a higher linear strain in grating period direction. This has the effect that the grating can achieve a large tuning range (about 150 times higher than any known implementations based on piezo-ceramic actuator materials). Further advantages of the present invention consist in that the manufacturing process is at a very low cost, simple and fast. In difference to previous systems which require several complicated micromachining processes (i.e. comb-drive driven tunable gratings), the production of a preferred embodiment of the invention requires relative inexpensive and commercially available materials such as PDMS (Polydimethylsiloxane, a widely used silicon-based organic polymer), Carbon Black or 3M VHB4910, 3M 9460 Acrylic Elastomers, Elastosil 625 and coating metals such as Au (Gold), Al (Aluminum) or ITO (Indium Tin Oxide), whereas this is only a selection of products.

When relatively inflexible materials are used, e.g. as coating material or for electrodes, improved flexibility may be achieved by applying a special shape to the inflexible material such that at least in one direction an improved lateral flexibility is obtained. Good results may be achieved by a wavy, concertina-fold like development which allows lateral deformation mainly due to bending. In an embodiment the concertina-fold like development is a result of the grating itself. In a further embodiment a concertina-fold like layer has in an undeformed state a wavy cross-section with straight side walls which are interconnected by sharp edges or blends of a certain radius, or a sequence of interconnected semicircles.

Gratings and phase shifters according to the present invention can be miniaturized which is important e.g. to make displays with small pixels or to be used in microscopes. Diffraction gratings have good diffractive properties (wavelength separation) down to 10 lines per diffraction grating. This means that theoretically, a resolution (smallest grating size) of 10×10 µm² can be achieved. A further advantage is that the mechanical impact is in plane (not as in rotated grating structures).

An embodiment of a tunable diffraction grating according to the present invention may be obtained by a procedure comprising the following steps:

1. Stretching of a polymer tape (elastomeric material acting as intermediate layer) as mentioned above by a certain amount, e.g. 200% to 300%;
2. Attaching the prestretched polymer film to a holding means, e.g. an encompassing frame;
3. Applying on each side of the polymer film an electrode, e.g. in that carbon black powder is printed by a stamp onto the surface or by spraying/coating or contact printing;
4. Applying a deformable grating consisting out of a polymer to at least one of the surfaces of the polymer film adjacent to an electrode.

It has been shown that in certain fields of application it is advantageous when the polymer film acting as intermediate layer is prestretched by a certain amount, before the deformable grating is attached onto the polymer film and then the polymer film and the deformable grating are stretched again before they are attached to an encompassing holding means and the electrodes are applied. Improved optical efficiency may be obtained in that the polymer film is stretched by 200%, then the deformable grating is applied and the polymer film and the deformable grating are stretch to total 300% before electrodes are applied and the polymer film is attached to the holding means.

A second embodiment of a tunable diffraction grating according to the present invention may be made by a procedure comprising the following steps:
1. Molding of a grating in a polymer film;
2. Stretching of the polymer film and the grating to a certain degree;
3. Attaching the prestretched polymer film to a holding means, e.g. an encompassing frame;
4. Applying on each side of the polymer film an electrode encompassing the grating, e.g. in that carbon black powder is printed by a stamp onto the surface or by spraying/coating or contact printing.

In an embodiment the intermediate layer of the actuator is stretched by a factor of i.e. 300% by 300% resulting in a film thickness t of 62.5 µm and mounted onto a ring shaped holding means with an external diameter of 40 mm and an opening of 30 mm. Two round compliant carbon black electrodes having a width of 5 mm and a diameter of 20 mm are contact printed by using a carbon black coated polydimethylsiloxane (PDMS) stamp. The carbon electrodes may be connected to metal electrodes that allow interconnection to a appropriate voltage source.

A deformable grating may e.g. be achieved by molding or in that a coating fluid, e.g. a polymer coating fluid, is spin coated onto a surface of a waver comprising a master grid, in that the fluid is applied onto the surface comprising the master grid, then the waver is rotated at a certain speed until the coating fluid is equally distributed. After curing of the coating fluid, the deformable grid can be removed from the surface comprising the master grid as an exact image of the master grid. Then the deformable grating is applied to the polymer film made out of deformable material which acts as substrate for the grating. If appropriate the electrodes can be made out of a translucent material or be applied in a different manner, e.g. by vaporization.

In an embodiment a diffraction grating is incorporated in or interconnected to an upper surface of a layer of deformable translucent material, such as an elastomer as described above, which acts as a substratum to carry and hold the grating in position. A secondary lateral deformation (in plane layer deformation), which determines the distance between the grooves of the grating, may be achieved in that the deformable material is at least partially deformed (compressed) in a primary direction perpendicular to its layer surface whereby the deformation ratio is determined by the poisson's ratio of the material. Depending on the utilized layer material and the shape and the support of the layer significant transmission ratios are achievable. Due to the reason that the lateral deformation is related to the poisson's ratio of a certain material it is relevant what layer materials are used. Good results are achievable by materials such as PDMS (Wacker Elastosil RT625) or 3M VHB tapes. PDMS typically has a poisson's ratio of 0.5 and VHB of 0.499.

A preferred way of generating the deformation in the primary direction is by coulomb forces. The layer of deformable material is arranged at least partially between an upper and a lower electrode which are in general arranged opposite to each other, normally coaxial with respect to an optical axis of the optical device. By applying a voltage between the electrodes, the electrodes are attracted by each other by coulomb forces what results in that the layer of deformable material is compressed in the first direction (primary deformation) and expands inplane in the lateral direction (secondary deformation). The deformation is implied by the poisson's ratio of the deformable material. The optically active elements of the diffraction grating are integrated or interconnected to the layer of deformable material such that the deformation has an influence onto the periodic structure (periodicity of shape) of the diffraction grating. To not hinder this deformation the diffraction grating, respectively the electrode must be deformable itself up to a certain stage. This can e.g. be achieved in that it has a concertina-fold or sawtooth-like cross section which allows lateral deformation in at least one direction. Alternatively or in addition the electrodes can be made out of conductive powdery material such as carbon black which is stamped or printed to the surface of the intermediate layer. If appropriate the electrodes may be made out of a translucent material.

Alternatively or in addition the diffraction grating may comprise rigid optically active elements which are supported and linked such that their distance to each other is adjustable. E.g. the diffraction grating consists out of thin bands of conductive material (e.g. gold or an other metal) aligned next to each other and bonded directly or indirectly onto the layer of flexible material.

A tunable diffraction grating according to the present invention may be applied in many fields of technology such as for microscopes, displays, light sources, cameras or in communication systems where light needs to be switched between different channels. The invention has the potential for many commercial applications because of simple and inexpensive production and the significant tuning range that can be achieved with the proposed device. One possibility is the use as beam expander, e.g. for virtual display devices similar to the application described in U.S. Pat. No. 2004109234. It can also be used as monochromatic light source. When white light is shone onto the grating, light is split up into its monochromatic components. This monochromatic light can be used in display devices. One advantage of such displays is that the displayed colors are not limited to the color gamut of state of the art display devices.

Of course, the current invention has also the potential to be used in communication applications in which beam switching is required. One application is the use as tunable diffraction grating for optical systems. Furthermore the tunable diffraction grating may be used as laboratory equipment for investigating the behavior of different systems (biological systems) when exposed to shape changing gratings/structures. A diffraction grating according to the present invention may be applied e.g. in form of a Fresnel-Lens in hand-held computers, personal digital assistants devices (PDA), mobile phones, digital video, cameras or any device that uses highly tunable diffraction gratings.

Good results are achieved by electroactive polymers which are used as actuators. Electroactive polymers are polymers whose shape is modified when a voltage or current is applied to them. Actuators comprising piezoelectric ceramics or shape memory alloys are well known and applied in several devices. In the last decade new types of actuators based on electroactive polymers (EAP) drew increasing attention. EAPs are promising because they have in a certain range likewise properties as natural muscles. This makes them very interesting for robotic applications where mammal movement is imitated. This is also the reason why EAPs are often called artificial muscles. Today known EAPs can produce strains up to 380%. EAPs generally may be divided in two different classes.

A first class of EAPs can be summarized as dielectric electroactive polymers (DEAP) wherein actuation is caused by electrostatic forces between electrodes. The electrodes are in general arranged opposite to each other on either side of a deformable polymeric material. When voltage is applied the opposite electrodes are attracted to each other and the in-between the electrodes arranged polymeric material is compressed. Due to poisson's ratio the compressed material expands in a perpendicular direction (lateral direction). This kind of electroactive polymers is characterized by a relatively large actuation voltage and comparable low electrical power consumption. To reduce hindering stresses it is advantageous that the electrodes are made deformable and/or cover the deformable material only partially, e.g. having a ring-shaped design. In an embodiment the substratum comprises a dielectric elastomer actuator with distinct lateral contraction behavior. Such elastomers are also known as artificial muscles. The gratings may be interconnected to, e.g. by bonding to, or integrated into a controllably deformable surface of such a dielectric elastomer actuator. The grating is deformed in relation to the substratum.

The advantage of changing the grating period and not the angle of the grating is the simple implementation and the fact that the −m and the +m order change their angle equally. This allows among several other applications the use in tunable structured illumination microscopes (described below). Additionally, such systems can be used in inexpensive natural color displays as well as in miniaturized tunable spectrometers or as expander in virtual displays. The tunable transmission grating not only outperforms existing product from the technical point of view but it is also commercially very attractive. The materials used for the production are not only inexpensive but the polymers show also excellent optical properties. Transmittance measurements showed for example that within the wavelength range of 400 nm to 800 nm, less than 1% of the light is absorbed by a 1 mm thick layer. Another major advantage is the simple fabrication process. Depending on the embodiment, two or three production steps are required.

An embodiment of the invention comprises a tunable diffraction grating with optically active elements which are arranged at a distance displaceable relative to each other in a second lateral direction. The optically active elements are mechanically interconnected to a layer made out of a deformable material, whereby a deformation of the layer in a first direction, which is in general perpendicular to the second lateral direction, causes a change in the relative distance and/or the periodic structure of the optically active elements. The lateral deformation is normally related to the first deformation via the poisson's ratio of the layer material. In a preferred embodiment the layer made out of deformable material is arranged in-between an upper and a lower electrode which compress the layer by coulomb forces when a voltage is applied between the electrodes. In general the length of the upper electrode is adjustable in at least one lateral direction and the upper electrode is mechanically interconnected to the layer such that a deformation of the layer results in a lateral deformation of the upper electrode in the lateral direction. Depending on the field of application the optically active elements may have a sawtooth, s-shaped or v-shaped cross-section, however, other shapes are also possible, e.g. the optically active elements consist out of thin stripes of material arranged laterally next to each other and supported by a substratum made out of deformable material such that their relative distance is adjustable. If appropriate the thin stripes of material may act as electrodes. The optically active elements may comprise pyramidal or spherical shaped elements and may be supported by a substratum made out of deformable material such that their relative distance is adjustable. A further embodiment may comprise an array of tunable diffraction gratings as described herein.

The herein disclosed invention offers the possibility to provide an optical element which acts as a so called phase shifter having in general a similar setup as a transmission grating as described before. When light travels through a medium, its wavelength decreases inversely proportional to the refractive index of the medium $\lambda=\lambda_0/n$, wherein $\lambda$ represents the wavelength of light in the medium, $\lambda_0$ is the wavelength of the light in vacuum and n denotes the refractive index of the medium. When light travels a distance of l through a medium with refractive index n, a phase retardation of $\phi=2\pi(n-1)l/\lambda$ is introduced compared to a beam traveling in vacuum. If the thickness of the medium is changed by a value of $\Delta l$, the phase difference between the two beams changes by $\Delta\phi=2\pi(n-1)\Delta l/\lambda$.

An embodiment of a phase shifter according to the present invention is based on an elastomeric transparent material, e.g. such as commercially available VHB 3410 tape by 3M with a refractive index of 1.79. For a wavelength $\lambda=488$ nm the phase shift is equal to $\Delta\phi[rad]=2\pi(1.79-1)\Delta l[nm]/488[nm]$.

In an embodiment of a phase shifter according to the invention, a layer of elastic material is arranged in an opening of an at least partially encompassing holding means. A first and a second electrode are arranged opposite to each other on either side of the layer of elastic material and electrically insulated with respect to each other by at least one insulating layer. In an embodiment the layer of elastic material consists out of an dielectric acrylic elastomer film, such as VHB 4910 acrylic tape supplied by 3M, with a certain refractive index n. In that a voltage is applied between the two electrodes the electrodes attract each other due to coulomb forces whereby the layer of elastic material in-between the electrodes is compressed such that its thickness changes.

When the electrodes are made out of a transparent material the area of the electrodes may act as a phase shifter.

In an embodiment of a phase shifter the electrodes are partially covering the layer of elastic material adjacent to an optical active area of the layer of elastic material. In that a voltage is applied in-between the two electrodes, the elastic material between the two electrodes is compressed due to the attracting coulomb forces between the electrodes. Due to the poisson's ratio of the elastic material between the electrodes is deformed in general perpendicular to the forces between the electrodes compressing in-plane the material of the optically active area in a controlled manner. Due to this secondary in-plane deformation the optically active area experiences an increase in its thickness due to the poisson's ratio of the material. To obtain good results the layer of elastic material is arranged in the holding means in a prestretched manner under certain tension forces such that an in plane compression does not result in an out-of-plane deformation e.g. due to negative forces. The change in the thickness of the optically active area results, due to the refractive index n of the material, in a phase change of a light beam passing through the optically active area. Depending on the field of application and the encompassing holding means, the electrodes may have different shapes, e.g. they are arranged (equally distanced) along the holding means, having an open or annular, regular or irregular design. Furthermore the electrodes may be arranged adjacent to the top surfaces of the layer of elastic material and/or at least partially embedded in the layer of elastic material.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 1 a perspective view of a tunable light transmission diffraction grating;

FIG. 2 a cross-section of the diffraction grating according to FIG. 1;

FIG. 3 Detail B of FIG. 2;

FIG. 4 the diffraction grating according to FIG. 1 in a deformed state;

FIG. 5 a cross-section of the diffraction grating according to FIG. 4;

FIG. 6 Detail D of FIG. 5;

FIG. 8 a perspective view of a first embodiment of a phase shifter;

FIG. 9 a cross-section through the phase shifter according to FIG. 8;

FIG. 10 the phase shifter according to FIG. 8 in a deformed state;

FIG. 11 a cross-section through the phase shifter according to FIG. 10;

FIG. 12 a perspective view of a second embodiment of a phase shifter;

FIG. 13 a cross-section through the phase shifter according to FIG. 12;

FIG. 14 the phase shifter according to FIG. 13 in a deformed state;

FIG. 15 a cross-section through the phase shifter according to FIG. 14;

DETAILED DESCRIPTION OF EMBODIMENTS

Figure 7:
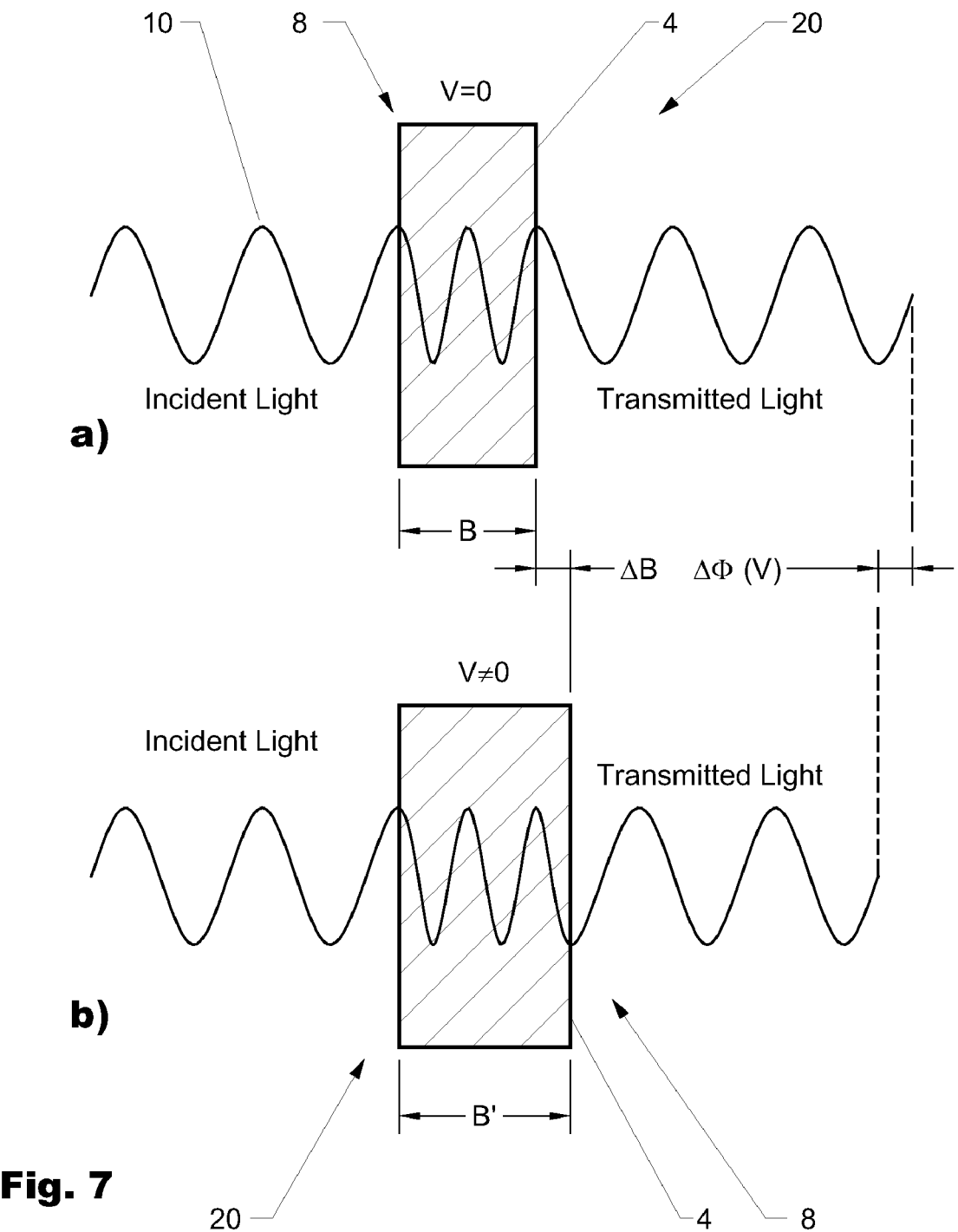
FIG. 7 schematically the setup of a phase shifter.

FIG. 1 through FIG. 6 are schematically showing a first embodiment of an optical element 1 according to the present invention, here a translucent tunable diffraction grating 1. While FIG. 1 is showing the diffraction grating 1 in an undeformed state, FIG. 4 is showing the same diffraction grating 1 in a deformed state. FIG. 2 is showing a cross-section along xz-plane through the centre of the diffraction grating according to FIG. 1 along line AA. FIG. 5 is showing a cross-section along xz-plane through the center of the diffraction grating according to FIG. 4 along line CC. FIG. 3 is showing detail B of FIG. 2 and FIG. 6 is showing detail D of FIG. 5.

The diffraction grating 1 comprises an upper and a lower electrode 2, 3 which encompass a translucent intermediate layer 4 and an optically active grating area 5. The electrodes 2, 3 act as driving plates of a driving means 15 to locally compress the intermediate layer 4 in a controlled manner. In the herein shown embodiment the grating area 5 is made as a separate element out of a deformable material which is then attached onto the intermediate layer 4 e.g. by gluing or welding. If appropriate, the grating area 5 can be part of the intermediate layer 4, e.g. in that it is embedded in a side surface of the intermediate layer 4. As it can be seen the intermediate layer 4 here has in an undeformed state a constant thickness B and is held in a prestretched manner in position in an opening 7 of an encompassing holding means (holding frame) 6. The electrodes 2, 3 are arranged opposite to each other on opposite sites of the intermediate layer 4 having an here annular design. Further they are arranged equally distanced from the holding means 5. The electrodes 2, 3 and the functionally interconnected intermediate layer 4 are forming an actuator 8 to deform the grating area 5 in a controlled manner.

When a voltage V, as schematically indicated in FIGS. 4 to 6, is applied between the electrodes 2, 3 the electrodes 2, 3 attract each other due to coulomb forces Fc which results in a local compression of the intermediate layer 4 in the area between the electrodes 2, 3 in a first direction (x-direction) and thereby in comparison to the undeformed state (B) a locally reduced thickness B'.

When a voltage V is applied between the two compliant electrodes 2, 3, an electric field pressure $p=\epsilon\epsilon_0(V/t)^2$ establishes due to electrical charges that build up at the elastomer-electrode interfaces. $\epsilon_0$ is considered as being the permittivity of free space and $\epsilon$ is the dielectric constant of the dielectric elastomer (e.g. $\epsilon$ of VHB is approximately 3.21). The electric field pressure induces stresses that result in a material strain. Therefore, application of a voltage results in a compression in thickness and a thereto related local elongation of the elastomer film in planar directions. This planar extension is transferred to the mechanically interconnected polymeric diffraction grating, and results in a change of the grating period. This causes the diffraction angle to change. Due to the poisson's ratio of the material of the intermediate layer a lateral, in the shown embodiment rotation symmetric, expansion of the in-between the electrodes 2, 3 compressed material occurs as indicated by arrows dr (here in radial direction). Which results in a radial herein rotation symmetric compression of the area of the intermediate layer 4 radially encompassed by the electrodes 2, 3 and the thereto interconnected grating area 5. Thereby the grating period d (see FIG. 3) changes to a different value d' as indicated in FIG. 6 by which the optical behavior of the diffraction grating 1 changes. A further effect consists in that the local thickness of the intermediate layer 4 increases to B". This effect is relevant for phase shifting optical elements as will be explained in more detail according to FIGS. 7 through 14. As it becomes obvious the grating period d (V=0), d'(V≠0) is a function of the applied voltage V.

The diffraction grating 5 of the optical device 1 can be equipped with different grating patterns resulting in different optical effects. In that the grating pattern consists out of parallel linear groves the device acts as tunable diffraction grating. In that the grating pattern consists out of concentric groves the device acts as adjustable Fresnel-Lens.

Good results are obtained in that the intermediate layer 4 consist out of soft, deformable material such as VHB 4910 with an absorption which is less than 1% for wavelengths between 400 nm and 800 nm. Intermediate layers 4 made out of dielectric elastomeric material are preferably used because large strains in the range of up to 380% are possible. Further advantages are a comparable high electromechanical efficiency and the possibility to achieve moderate to high bandwidths (above 1 kHz). These actuators can therefore be used to change the grating period in the range of 10% to 300%. E.g. incident white light 10 which travels along an optical axis 11 (x-direction) and passes the actuator 8 and the grating area 5 is split up in components of different wavelength 12, 13 which are emitted at certain first angles $\alpha 1$, $\alpha 2$ depending on the grating period d defined by the lateral deformation of the grating 5. By changing the grating period d' components of the light are emitted at different angles $\beta 1$, $\beta 2$. In an example given wherein the deformable material consists out of elastomeric material, the change of the diffraction angle for a wavelength of 532 nm is between 20 mrad and more than 100 mrad. When voltage is applied to electrodes, i.e. made out of carbon black, the deformable elastomeric material in between the electrodes is compressed. Due to the material's poisson ratio of i.e. 0.499, the compression in the first direction results in a planar expansion in a second direction. This expansion of the electrode area causes a grating area that is mechanically interconnected to the same prestrained polymer to compress in planar direction. This compression is translated into a decrease of the grating period that causes the angle of the $m^{th}$-order diffraction to increase.

FIG. 7 schematically explains the functional principle of a phase shifter 20 according to the present invention. When incident light 10 travels through a medium (intermediate layer) 4, its wavelength decreases inversely proportional to the refractive index of the medium $\lambda=\lambda_0/n$. Here $\lambda$ represents the wavelength of light in the medium 4, $\lambda_0$ is the wavelength of light in vacuum and n denotes the refractive index of the medium 4. When light travels a distance of B through the medium of the intermediate layer 4 (see FIGS. 8 through 15) with refractive index n and then exits the medium, a phase retardation of $\phi=2\pi(n-1)B/\lambda$ is introduced compared to a beam travelling in vacuum. If the thickness of the medium 4 changes by $\Delta B$, the phase shift $\Delta\Phi$ between the two beams changes by $\Delta\phi=2\pi(n-1)\Delta B$.

A phase shifter 20 according to the present invention has in general a similar setup as a tunable diffraction grating based on elastomeric transparent materials as described earlier. One possible material is the already mentioned commercially available VHB 3410 tape of 3M. This material has a refractive index of 1.79. thus using the formula for a phase shifter presented earlier, for a wavelength $\lambda=488$ nm the phase shift is equal to $\Delta\Phi[rad]=2\pi 0.79\Delta B/0.488$ [microns].

FIGS. 8 through 11 show a first embodiment of phase shifter 20 and FIGS. 12 through 15 show a second embodiment of a phase shifter 21 which are both based on a dielectric polymer actuators 8 as described before. FIG. 8 is showing the first embodiment of the phase shifter 20 in an undeformed state when no voltage is applied to electrodes 2, 3 (V=0). FIG. 9 is showing a cross-section, parallel to xz-plane, through the first embodiment 20 along line DD of FIG. 8. FIG. 10 is showing the first embodiment in a deformed state, when a voltage (V≠0) is applied to the electrodes 2, 3. FIG. 11 is showing a cross-section, parallel to xz-plane, through the first embodiment 20 along line EE of FIG. 10. FIG. 12 is showing the second embodiment of the phase shifter 21 in an undeformed state when no voltage is applied to electrodes 2, 3 (V=0). FIG. 13 is showing a cross-section, parallel to xz-plane, through the second embodiment 21 along line FF of FIG. 12. FIG. 14 is showing the second embodiment 21 in a deformed state, when a voltage (V≠0) is applied to the electrodes 2, 3. FIG. 15 is showing a cross-section, parallel to xz-plane, through the second embodiment 21 along line GG of FIG. 14. The difference between the first embodiment according to FIGS. 8 through 11 and the second embodiment according to FIGS. 12 through 15 mainly consists in that the electrodes 2, 3 of the first embodiment are arranged on top of the intermediate layer 4 and the electrodes 2, 3 of the second embodiment 21 are arranged inside the intermediate layer. The functionality of both phase shifters is in principle the same. In both embodiments 20, 21 the actuator 8 comprises an elastomer film (intermediate layer) 4 e.g. such as VHB 4910 acrylic tape, VHB 4960 or Elastosil 625, which builds the core of the dielectric elastomer actuator 8.

The intermediate layer 4 of this example is prestrained by a factor of e.g. 300%×300% resulting in a film thickness t of approx. 62.5 µm. The intermediate layer 4 is then mounted onto a ring holder with an external diameter of 40 mm and an internal opening 7 having a diameter of 30 mm. Next, the herein round shaped annular carbon black electrodes having a width of 2 mm to 5 mm and a diameter of 20 mm to 28 mm are contact printed opposite to each other by using a carbon black coated polydimethylsiloxane (PDMS) stamp. The carbon electrodes 2, 3 are connected to metal electrodes (not shown in detail) that allow connection to a high voltage device.

When a voltage V is applied to the electrodes 2, 3, by a voltage supply 9 the elastomer in between the electrodes 2, 3 is compressed by the electrodes 2, 3 due to coulomb forces Fc. Thereby the thickness of the intermediate layer 4 in the area between the electrodes is reduced from B to B'. Because of the poisson's ratio of the material of the intermediate layer 4, e.g. 0.499, the compression causes a lateral dr (here in radial direction), planar expansion parallel to yz-plane. This expansion of the intermediate layer 4 in between the electrodes 2, 3 results in a lateral compression of the transparent central area 9 of the intermediate layer. This lateral compression causes a local increase of the thickness of the transparent area 9 from B to B" due to the poisson's ratio of the material. Thus, the length of the transmission path of a light beam through the phase shifter 20, 21 can be varied by applying a voltage V from B to B".

The performance of a phase shifter 20, 21 according to the present invention was measured with a two beam laser interferometer at a wavelength of 488 nm. The phase shifter 20, 21 was inserted into the optical path of one beam (beam diameter was varied between 1 and 5 mm) and tuned by applying a voltage V between the electrodes 2, 3. First, the optical quality of the phase shifting film 4 was examined. For this the two laser beams were brought to interference and then the generated pattern was observed with a microscope (straightness and shape of the interference fringes) with and without phase shifter. Because the structure of the interference pattern did not change, it was concluded that the thickness variation of the film is smaller than $\lambda/5$.

Figure 16:
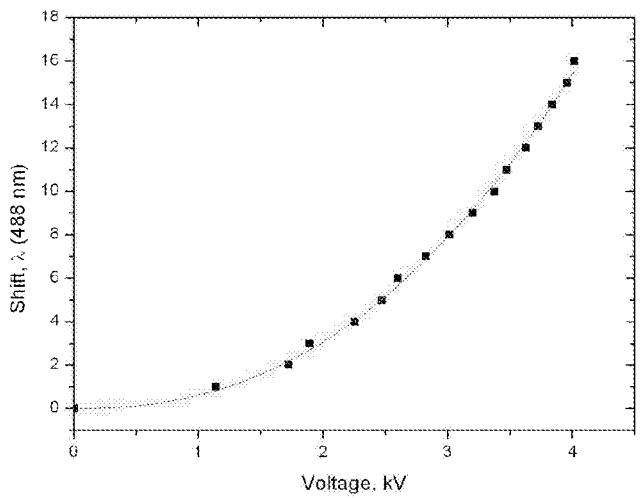
FIG. 16 a graph showing the relation between phase shift and applied voltage.

The dependency between the applied voltage V and the phase shift $\Delta\Phi$ was measured by a CCD camera in that the movement of the interference pattern was recorded. A comparison of a series of images resulted in the voltage-phase shift dependence which is shown in FIG. 16. Changing the voltage from 0 to 4 kV results in a phase retardation of 16 wavelengths (The phase shift of one period corresponds to a retardation of one wavelength ($2\pi$ radians)). In the present example the graph shown in FIG. 16 can be approximated with a polynomial of power 2.3.

Phase shifters 20, 21 as described herein can be inserted into any optical beam path which makes it suitable for experimental use on an optical table, for microscopy, optical data transmission, spectrometry as well as any other optical application that requires a phase shifting device. Additionally it is very accurately adjustable, inexpensive in production and the design (size, form, tuning range) can easily be adapted to a given requirement. E.g. in laser microscopy the coherence of the light causes problems. Reflections that are always present in optical systems create interference fringes that lower the evenness of the illumination field. To improve the illumination so called light scrambling can be used. Light scrambling destroys local interference patterns by sweeping them over the sample during the image acquisition time. A phase shifter 20, 21 according to the present invention can solve this problem when it is driven with an ac voltage. The phase shifter in oscillation mode changes constantly the output phase of the laser light so that the effects of interference average out over the image acquisition time. The phase shifter could be implemented as a light scrambler in any widefield microscope using a laser as a light source.

Subsequently examples of application of a phase shifter and a tunable diffraction grating in microscopy, especially in total internal reflection microscopy (TIR-microscopy) are given. During the past two decades total internal reflection fluorescence microscopy (TIRF-microscopy) became a method of choice for cell biologists (see Schneckenburger, H., Total internal reflection fluorescence microscopy: technical innovations and novel applications. Current Opinion in Biotechnology, 2005. 16(1): p. 13-18.; Axelrod, D., Total internal reflection fluorescence microscopy in cell biology, in Biophotonics, Pt B. 2003, ACADEMIC PRESS INC: San Diego. p. 1-33). The TIRF technique allows a selective excitation of fluorescent molecules located within a few hundred nanometers to the cover slip. By now, this method has found numerous applications in studies investigating membrane dynamics, endocytosis, exocytosis, studies of protein trafficking, etc. The foundation of the TIRF technique is based on the effect of total internal reflection (TIR).

At the interface of two media with different reflective indices $n_1$ and $n_2$ light traveling within the denser medium (with index $n_1$) can experience total internal reflection on the interface. TIR occurs for angles bigger than the so called critical angle $\alpha_c = \arcsin(n_2/n_1)$. In the less dense medium the light forms a so called evanescent field. The intensity of this evanescent fields decays exponentially in the direction perpendicular to the interface. The main characteristic of the evanescent field is the penetration depth $$d = \frac{\lambda}{4\pi} \frac{1}{\sqrt{n_1^2 \sin^2(\alpha) - n_2^2}}$$

Where $\lambda$ is the wavelength of the incident light $\lambda$, $n_1$ and $n_2$ are the refractive indices of the denser and the less dense media, respectively. $\alpha$ denotes the angle of incidence.

In an experimental system, the range of the penetration depth is between 70 nm and 300 nm. Thus achieved axial resolution is several times better than the axial resolution of conventional fluorescence microscopy (800 nm) and confocal microscopy (600 nm). As the penetration depth of the evanescence field strongly depends on the angle of incidence $\alpha$, there is the opportunity of a further increase of the axial resolution by comparison of fluorescent images obtained for several incidence angles (see Rohrbach, A., Observing secretory granules with a multiangle evanescent wave microscope. Biophysical Journal, 2000. 78(5): p. 2641-2654).

The developed TIR setup employs an objective-launched scheme (see Axelrod, D., Total internal reflection fluorescence microscopy in cell biology. Traffic, 2001. 2(11): p. 764-774). The laser beam is focused on the back focal plane of the objective lens. This ensures a collimated laser beam emerging from the objective. The incidence angle and the direction of the emerging beam can be changed by steering the focal spot in the objective back focal plane. To achieve TIR mode at the oil-water interface, an objective with a NA larger than 1.33 must be used. In an experimental setup we used a Zeiss $\alpha$-Plan-Fluar 100×, NA 1.45 oil immersion objective.

Figure 17:
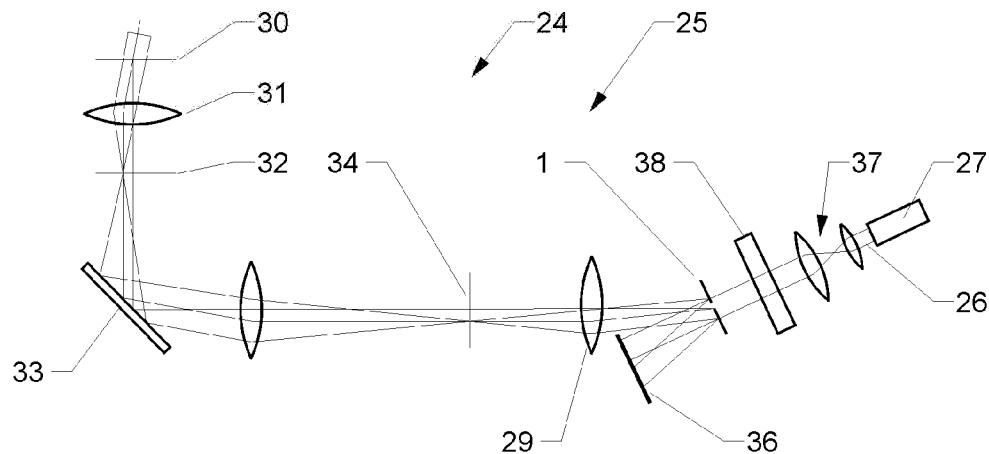
FIG. 17 schematically a first embodiment of an optical path of a microscope comprising an optical element according to the present invention.

FIG. 17 schematically shows in an exemplary manner a TIR-setup of a microscope 24 according to the present invention based on an epifluorescence path 25 of a Zeiss Axiovert 200M inverted microscope which in an example was used for launching a laser beam 26 of a laser 27 into a system. A back focal plane 32 of a microscope objective lens 31 is conjugated with a microscope aperture stop plane 34. Thus for the realization of the objective type TIR scheme, the laser beam 26 has to be focused onto the aperture stop plane 34. The collimated laser beam 26 is widened with a beam expander 37 e.g. by a factor five. This expanded beam is directed onto a diffraction grating 1 according to the herein discussed invention. The beam diameter, which defines the diameter of the illumination field in the specimen plane, can be adjusted with an iris diaphragm 38. In the herein described experimental setup, a specimen illumination area with a diameter of 50 µm was chosen. The beam incident onto the diffraction grating 1 is decomposed into light propagating into different directions (orders). All diffraction maxima except of the first order are blocked with a diaphragm 36. For simplicity only the central maximum and two first diffraction maxima are schematically shown. The diffraction grating 35 is installed in the focal plane of a lens 29. In the example a plano-convex lens of 90 mm focal distance was used. The lens focuses the light of the unblocked first-order diffraction maximum onto the aperture stop plane 34 of the microscope 24. To facilitate the adjustment, the lens was mounted into an XY-translating holder (not shown in detail).

In a first calibration step, the focusing lens 29 was axially adjusted to obtain a collimated beam emerging from the objective 31. To investigate the quality of the collimation, the beam profile was analyzed and the focal spot in the back focal plane 32 of the objective 31, here with an additional Bertrand lens (not shown in detail) in the optical path of the microscope, was inspected.

Instead of using state of the art translational and rotational stages for beam steering, an electrically tunable transmission diffraction grating 1 according to the present invention was used to position the laser focal spot in the aperture stop plane 34. The light steering is based on the fact that the grating period changes when a voltage is applied to the tunable diffraction grating. This grating period change is translated into a change of the first-order diffraction angle. Therefore a change in the voltage V modifies the emerging angle of the beam. Therefore it is easily possible to switch from TIR to epifluorescent microscopy. The rapid movement of the focal spot in the objective back focal plane 32 allows illuminating the specimen with all possible angles allowed by the objective aperture and fully exploit the resolution power of the objective.

In the described example the imaging was performed for typical laser intensity of 10 mW (at output of the fiber). This corresponds to a laser intensity of 0.5 mW or 5% in the first-order diffracted beam. Digital images were acquired using a cooled CCD camera (ORCA ERG, Hamamatsu).

Figure 18:
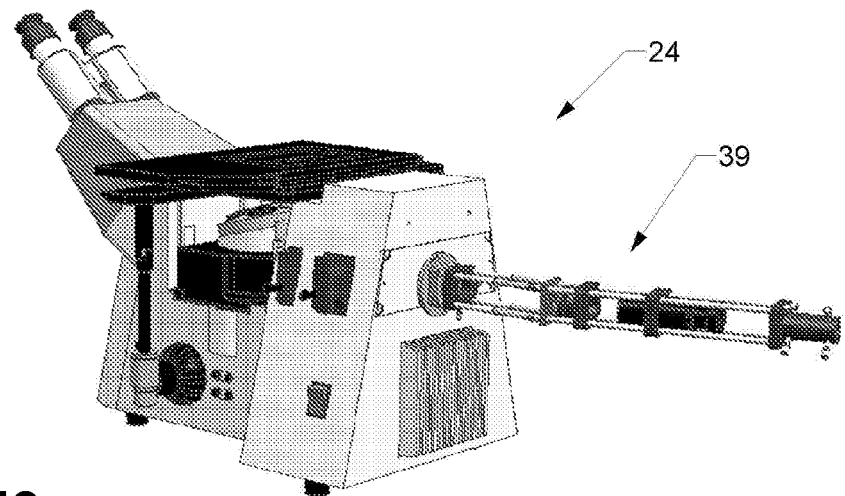
FIG. 18 a microscope comprising an optical path according to FIG. 17.

The herein described TIR-setup can be connected to many of the commercially available microscopes by choosing a suitable light launching port. FIG. 18 shows a picture of the previously discussed setup mounted on the fluorescence port of a microscope 24, e.g. a Zeiss Axiovert 200M. Of course, it would also be possible to realize a setup on a microscope slider port (not shown in detail). The optical setup 39 is described more detailed in accordance with FIG. 19.

Figure 19:
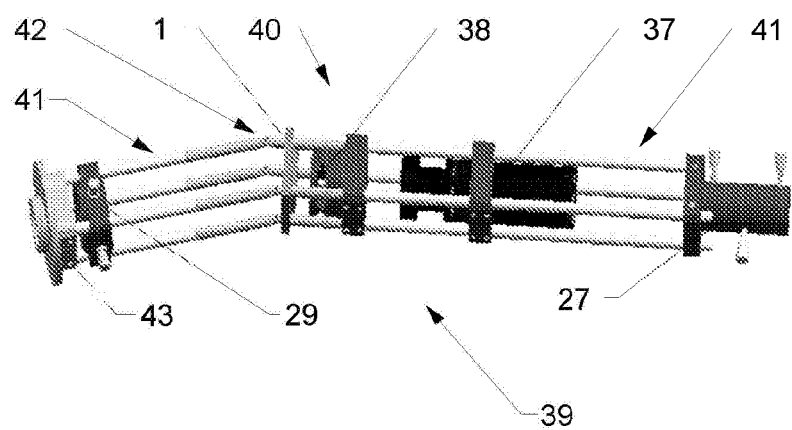
FIG. 19 a detailed view of a setup of an optical path according to FIG. 17.

FIG. 19 shows a detailed view of the optical embodiment as shown in FIG. 18 and as described in accordance with FIG. 17. The setup comprises a holding means 40 with four parallel rods 41 which are laterally adjustable by joint connections 42. At the front end the holding means 40 comprises a connector 43 by which it is attachable to a microscope 24 see FIG. 18). On the rods 41 a laser source holder 27 is arranged at the rear end followed by a beam expander 37, a iris diaphragm 38 and a light transmission diffraction grating 1 according to the herein discussed invention. Further, a converging lens 29, in the shown embodiment having a focal length of 90 mm, is arranged before the connector 43.

Figure 20:
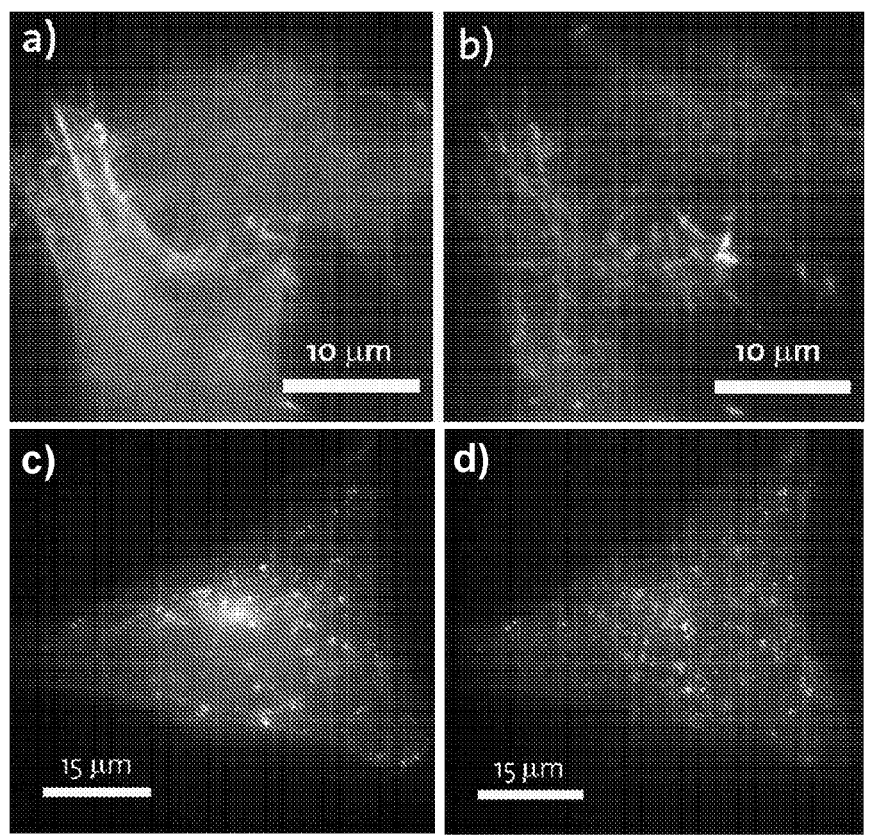
FIG. 20 comparison of the performance of a TIR microscope according to FIG. 18 and a conventional TIR microscope.

In FIG. 20 a comparison of images of HeLa cells expressing actin-green fluorescent protein (GFP) obtained with TIR microscope according to the present invention (FIGS. 20*b*) and conventional TIR microscope (FIGS. 20*d*) (not shown herein) is shown. Standard epifluorescence images of the same cells (FIGS. 20*a*) and *c*)) are also presented. The epifluorescence image of FIG. 20*a*) contains a lot of blur obscuring image details. The TIR image of FIG. 20*b*) clearly shows the advantage of a TIR microscope as herein described. It can be seen that much more details become visible in the TIR-mode compared to epi-mode. This is due to the fact that only the area close to the cover slip is excited.

The comparison between the images taken with a TIR based on a tunable diffraction grating (FIG. 20*b*) and TIR images taken with conventional TIR microscope (FIG. 20*d*) shows that the current invention produces images of the comparable quality comparable to a conventional TIR microscope (FIG. 20*d*). One advantage of a setup with a tunable transmission diffraction grating according to the present invention is the fact that the device can be tuned by simply applying a voltage V to the device. Mechanical adjustments can be avoided and therefore less vibration is induced. A further advantage consists in that it is easy to accurately adjust the light direction to control the depth of the evanescent field. The fact that the light direction is adjustable over a wide angular range also enables the use of different types of samples with different values of refractive index. Another advantage is the fast switching without introducing strong mechanical vibrations.

Epi imaging with a single laser spot in the back focal plane may lower the resolution power of a microscope. A linear polarized laser beam excites only fluorophores with a dipole moment in the plane of polarization. To excite all fluorophores the linear polarization of the laser light can be turned to circular polarization by adding a quarter wave plate. The use of circular polarised light minimises possible anisotropic excitations of fluorophores with a fix dipole orientation in the specimen. Another possibility to excite all fluorophores is a rapid movement of the focal spot in the back focal plane of the objective. This also reduces the anisotropy in excitation. Both methods can of course be combined. Another problem in epi mode is the interference fringes due to reflections when using coherent laser light. These fringes can be avoided by light scrambling (shaking the light fiber with a piezo) that destroys the coherence of the laser light. In addition or alternatively a phase shifter 20, 21 (see FIGS. 8 to 15) according to the present invention can be used.

Figure 21:
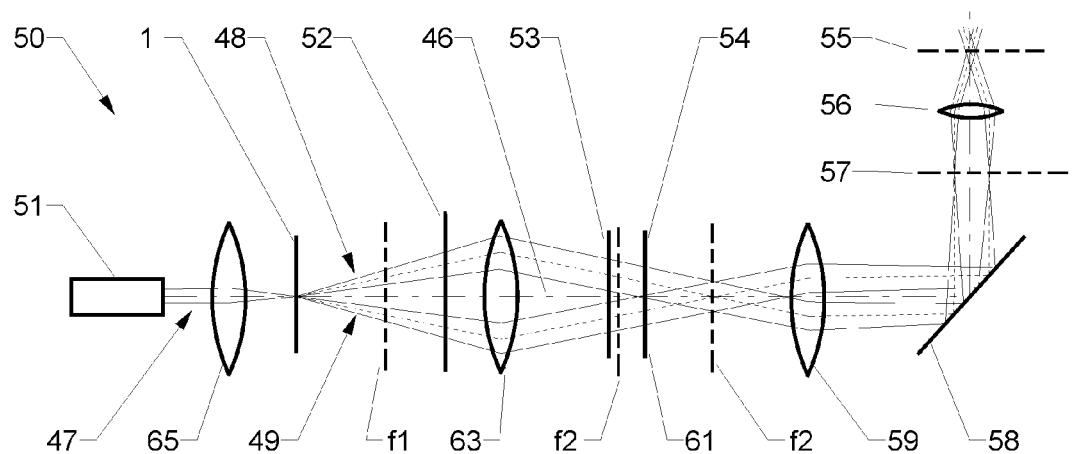
FIG. 21 schematically a second embodiment of an optical path of a microscope comprising an optical element according to the present invention.

FIG. 21 schematically shows a setup of a HELM-microscope 50 according to the present invention. Harmonic Excitation Light Microscopy (HELM) also referred to as Standing Wave or Structured Illumination Microscopy is a technique that improves the resolution of a conventional light microscope up to twofold and even more when combined with deconvolution techniques. The commercially available state of the art confocal microscopes, achieve an improvement of factor 1.4 compared to a standard microscope.

In harmonic excitation light microscopy approach the specimen is illuminated with a 2D cosine pattern produced by four interfering laser beams. This harmonic excitation shifts spatial frequencies of the specimen that are beyond the classical cut-off frequency, into the passband of the microscope. The extended passband is reconstructed computationally out of a set of images acquired with shifted illumination pattern. The technique achieves 100 nm lateral resolution which is an improvement by a factor of 2 compared with conventional fluorescence microscopy (see J. T. Frohn et al. True optical resolution beyond the Rayleigh limit achieved by standing wave illumination, PNAS, Vol. 97, No. 13, pp. 7232-7236 (2000); M. G. L. Gustafsson, Surpassing the lateral resolution limit by a factor of two using structured illumination microscopy, Journal of Microscopy, Vol. 198, pp. 82-87 (2000).

In general the employed interference pattern can be shifted in two directions relative to the specimen. Five images for different positions of the pattern are recorded by a camera. From these five images, the additional information not accessible in conventional microscopy can be extracted by an algebraic approach. By changing the angle between the interfering beams the system can also provide TIR mode (see E. Chung et al. Extended resolution wide-field optical imaging: objective-launched standing-wave total internal reflection fluorescence microscopy, Optics Letters, Vol. 31, Issue 7, pp. 945-947 (2006)).

In FIG. 21 a setup for structured illumination microscopy according to the herein discussed invention is schematically shown. This embodiment employs an objective-launched illumination resulting in no restriction of the functionality of a microscope 50.

In the shown embodiment a linear polarized laser beam 47 with a diameter of e.g. 1.1 mm is emitted by a laser 51 and is directed onto a diffraction grating 1 according to the present invention here via a first lens 65. As a result of diffraction by the tunable light transmission diffraction grating 1 the incident laser beam 47 is decomposed into a non-deviated zero maximum (not shown in detail) and several deviated diffraction maxima 48, 49 (In the schematic drawing only two diffraction maxima 48, 49 are shown). In reality the four beams are used in the setup. They are arranged in general rotation symmetry around a optical axis 46 at a distance of 90° with respect to each other.

To create the interference pattern the four beams (in the drawing only two beams 48, 49 are visible) of the first diffraction maxima with an angle of 100 mrad to the optical axis 46 are used. To get the two pairs of laser beams independent from each other, one pair passes through a half wave plate 52, that turns the polarization by 90 degrees (light beams with perpendicular polarization cannot interfere with each other). The diffracted beams can be blocked later with a movable diaphragm 54 which is arranged movably. Changing its position allows to chose between HELM (first order maxima pass) and epi-fluorescence mode (zero order maximum passes). The beams pass through a telecentric lens system comprising a second and a third lens 63, 59 with a focal length of e.g. f1=40 mm (second lens 63), f2=50 mm (third lens 59) focusing them on the back focal plane 57. Choosing the beam distance to the optical axis 46 (in the objective back aperture plane 57) close to the diameter of the objective entrance pupil will result in TIR mode of illumination. In TIR mode the penetration depth of the evanescent field depends on the angle of illumination (see equation on page 33) and can be adjusted by changing the distance between a single beam and the optical axis 46. To improve the quality of the epi illumination it is possible to use the same methods as described in the TIR-embodiment.

The divergence of the Gaussian beam is controlled by the first lens 65 which is arranged in front of the tunable diffraction grating 1. By shifting the first lens 65 along the optical axis 46 a range of divergence after the third lens 59 can be realized. This means that any input laser beam 47 can be adjusted to suit to different microscopes. Further it can be used to choose the size of the field of illumination independently for each sample which is important e.g. to reduce photo bleaching of the fluorophores in not observed regions.

Figure 22:
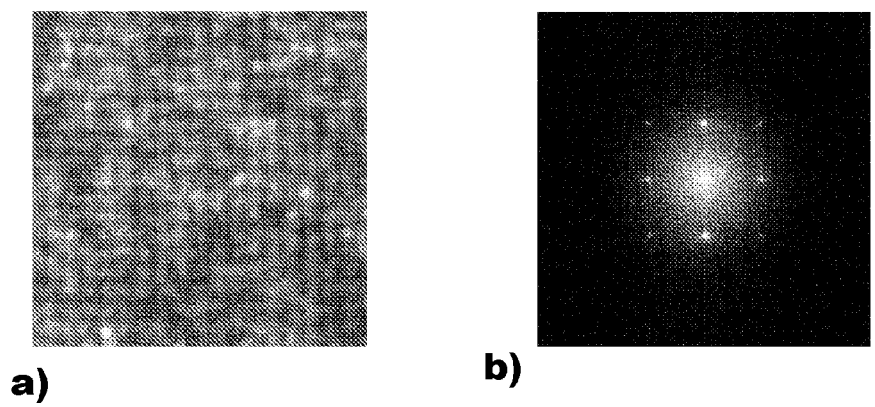
FIG. 22 interference patter in image plane of a microscope according to Figure (FIG. 21a) and Fourier transform of this interference pattern (FIG. 21b)

FIG. 22 shows results of preliminary experiments that were done without changing the polarization of the beams. The interference pattern of five (zero and first order) parallel polarized beams are shown in FIG. 22a). FIG. 22b) shows the corresponding Fourier spectrum.

Figure 23:
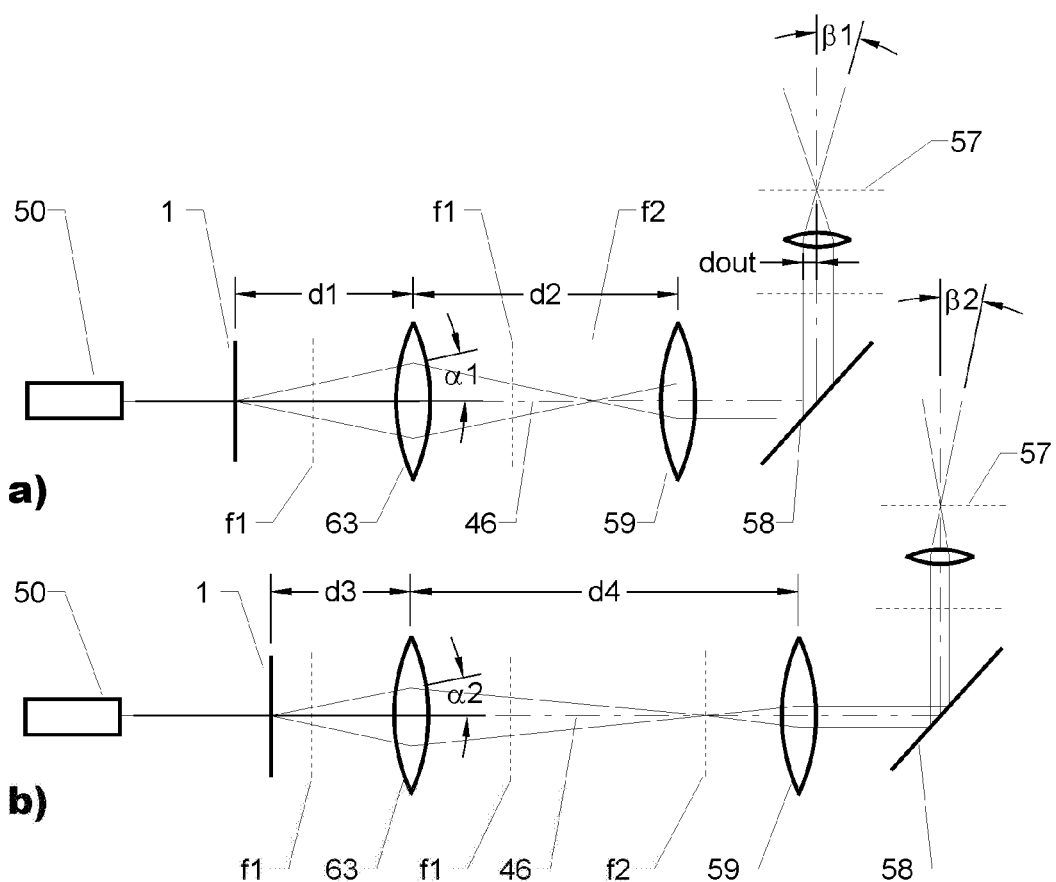
FIG. 23 schematically the functionality of an optical path according to FIG. 21.

As shown in FIGS. 23a) and b), the distance between the beams and the optical axis in the back focal plane 57 can be controlled in a classical way by precise translation of a phase grating 1 with respect to a first lens 63 and appropriate movement of a second lens 59 to generate parallel beams at the microscope port. The variations of the distances d1 and d2, respectively d3 and d4 have to be in accordance to the following equation $$d_1 = d_2 \frac{\alpha f_2 (d_{out} f_1 + d_{out} f_2 + \alpha f_1 f_2)}{d_{out} f_1 (d_{out} + \alpha f_2)}$$

to keep the system telecentric which could be done with computer controlled linear stages. Here $d_{out}$ is the distance between the beams and the optical axis in the back focal plane 57. Movement of the illumination pattern can be achieved with any conventional positioning device. The grating 1 can e.g. be mounted on an xy-piezo actuator (not shown in detail).

A translation of the grating perpendicular to the optical axis 46 shifts the interference pattern in the specimen plane. The distances d1 and d2, respectively d3 and d4 determine the angle of illumination $\beta(\beta 1, \beta 2)$ for a fixed deflection angle. Moving the grating closer to the focal spot f1 and increasing d2 according to the before mentioned equation results in a smaller angle of illumination $\beta 2 < \beta 1$.

Instead of using an xy-piezo actuator a phase shifter 20, 21 according to the herein disclosed invention (see FIGS. 8 through 15) can be used to control the position of the illuminating pattern. The phase shifter can be introduced anywhere in the light path and control the phase of each beam independently.

The distance between the beams in the objective back focal plane 57 can be controlled by changing the grating period of a tunable diffraction grating according to the herein disclosed invention (see FIG. 1 to 6). A decrease of the grating period d increases the diffraction angle of the first order maxima and therefore the angle of illumination in the specimen plane. The position control of the illumination pattern can e.g. be provided by moving the grating with an xy-piezo actuator in lateral direction with respect to the optical axis 46.

Variation of the beam distances by electrically changing the diffraction angle of a diffraction grating according to the present invention. To move the pattern a phase shifter as previously described is introduced into the system. It controls the phase of one beam in each interference pair. The shifting of the phase results in a translation of the pattern along the direction of interference.

The use of an actuator as previously described comprising a translucent intermediate layer and a pair of opposite in general coaxial electrodes provides several advantages compared to classical mechanical counterparts. It allows fast variations of the deflection angle without introducing any mechanical disturbance into the system. Especially for TIR multi-color imaging the grating lattice has to be adapted to the illuminating wavelength. The same holds for HELM multi colour mode. To achieve homogeneous resolution for all colors the period of the interference pattern has to be held constant. This requires a precise and reproducible adjustment of the beams which may not be provided by mechanical translation stages. Because no mechanical disturbance acts on the optical mount, it is believed that the use of adaptive optics based on the described actuators will increase the stability of the system. Further, the fast operating devices will help to decrease the image acquisition time dramatically. In general the described setup can be implemented in any commercially available fluorescence microscope by choosing a suitable connector for the microscope port. The grating with wave plates and diaphragm can be mounted in a rotation stage to provide an interference pattern in lateral direction.

Figure 24:
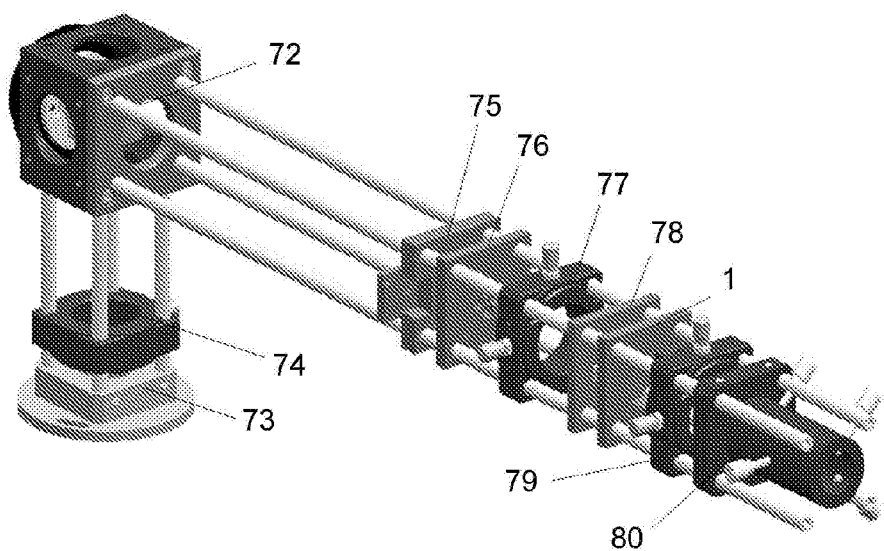
FIG. 24 a setup of an optical path according to FIG. 21.

FIG. 24 shows a setup in which the beams are directed into the microscope (not shown in detail) via a mirror and/or a beam splitter cube 72. Using a beam splitter 72, it is possible to connect additional light sources e.g. such as UV-Laser or other lasers for multi-color imaging.

In a further embodiment (not shown in detail) a slider port of a microscope is used with a freely moveable slider launch and a free standing beam controlling system. This setup offers several advantages: (i) It is easy to mount, allowing fast attachment and detachment; (ii) The use of a beam splitter in the slider maintains the full functionality of the microscope because the normal lamp can still be used for conventional epi-illumination; (iii) A free standing controlling system coupled to the microscope via the optical table provides high mechanical stability and due to its compact design it is not susceptible to low frequency vibrations.

Further applications of the invention are in the field of systems for positioning of nano particles. However, optical trapping of nano particles in the evanescent field of a TIR system has already been reported (see S. Kawata et al. Movement of micrometer-sized particles in the evanescent field of a laser beam, Optics Letters, Vol. 17, No. 11, p. 772 (1992); M. Gu et al. Laser trapping and manipulation under focused evanescent wave illumination, Appl. Phys. Lett. 84, 21 (2004)). By the herein disclosed invention single intensity peak can be used for selective trapping of particles and shift the peaks for positioning.

Latest developments in the field of structured illumination microscopy deal mainly with the problem of creating a set of controllable laser beams that can be brought to interference. E. Chung et al. used a beam splitter to create two beams. One beam is deviated over a retroreflector, which is mounted on a piezoelectric transducer to control its phase. Both beams are then coupled into optical fiber tips housed in a mirror mount placed on an XYZ translator from which they are launched into the microscope. There are several reasons to go this way. For high-resolution imaging the phase pattern has to be stabilized. But this method has some disadvantages and one is the use of cost intensive transducers and translators. Another disadvantage is the only one-dimensional pattern. To achieve a two-dimensional resolution improvement the sample has to be rotated 90° where the centre of the observed area has to remain precisely on its position.

Another possibility to create a structured illumination was realized by M. G. Gustafsson. He uses a one-dimensional phase grating and projects it on the specimen. By moving the grating he also moves the pattern. The lack of control over the beam emerging angle in this setup makes it not suitable for TIR microscopy.

In the present invention the advantage of a grating based structured illumination with the need for distance controlling the angle of the emerging beams by using a low cost tunable grating as described are combined. Preferably four beams are used in TIR mode to improve the resolution simultaneously in x, y and z direction.

A grating that produces a circular diffraction pattern can be used in the proposed system to realise a TIR illumination. The light ring of the first order maximum can be treated as the four beams resulting from a double axial grating. The same adjustment and light path as described above is valid. A TIR system that fills a whole circle in the objective back focal plane can solve all the problems described in accordance with the embodiment as shown in FIG. 17. The same effect could be produced by simply rotating a single or n-axial grating around the optical axis.

Figure 25:
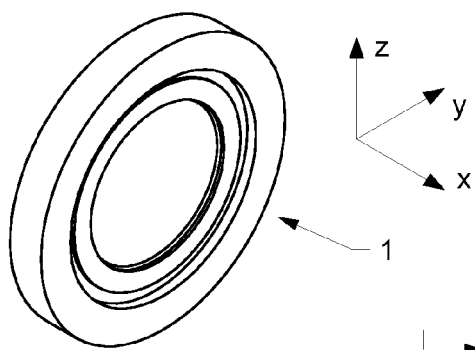
FIG. 25 a further embodiment of an optical element according to the present invention.
Figure 26:
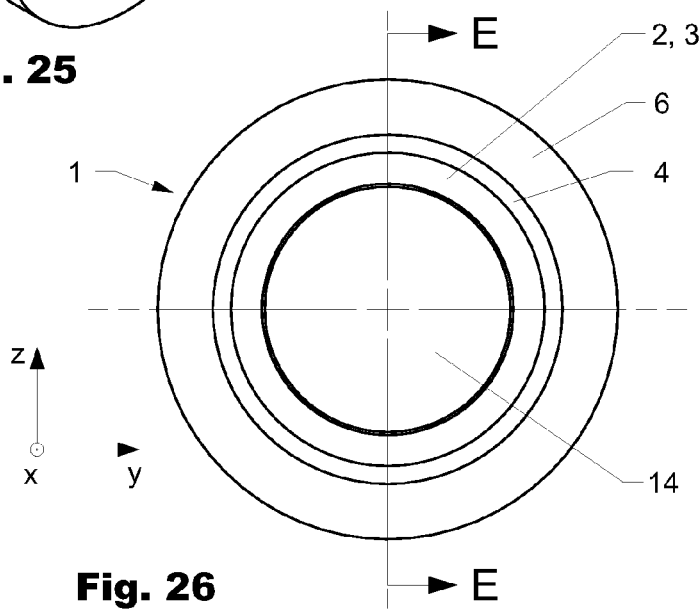
FIG. 26 the optical element according to FIG. 25 in an undeformed manner in a front view.
Figure 27:
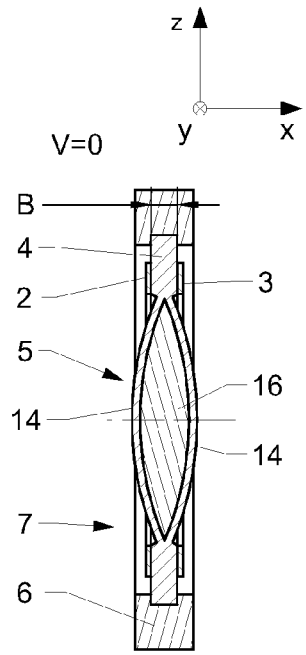
FIG. 27 the optical element of FIG. 26 in a side-view cut along line EE.
Figure 28:
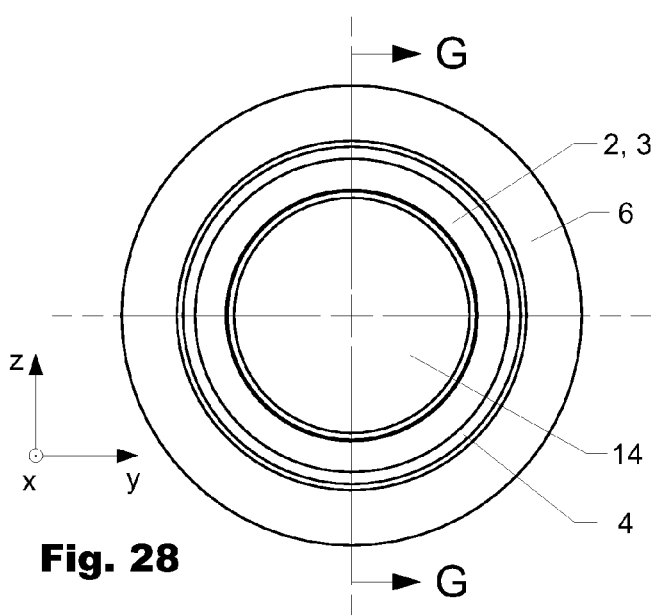
FIG. 28 the optical element according to FIG. 25 in a deformed manner in a front view.
Figure 29:
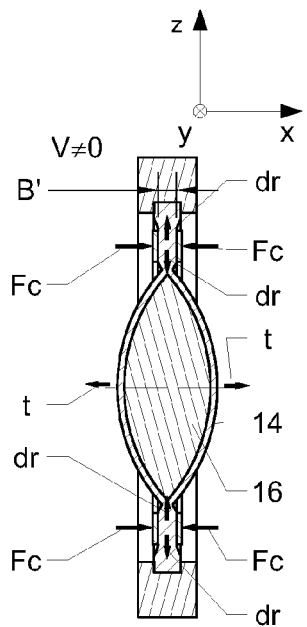
FIG. 29 the optical element of FIG. 28 in a side-view cut along line GG.

FIGS. 25 through 29 are showing further embodiment of an optical element 1 according to the present invention here in the form of an tunable lens. FIG. 25 is showing the device 1 in a perspective manner. FIG. 26 is showing the device in an undeformed manner when no voltage (V=0) is applied in a front view and FIG. 27 in a side-view cut along line EE of FIG. 26 such that the inside of the device 1 becomes apparent in an undeformed state. In comparison to FIGS. 26 and 27, FIG. 28 is showing the device 1 in a front view in a deformed manner when a voltage (V≠0) is applied. FIG. 29 shows the device 1 in a side-view cut apart along line GG of FIG. 28 such that the inside becomes apparent in a deformed state.

The tunable lens 1 comprises an upper and a lower electrode 2, 3 which are arranged opposite to each other and encompass a translucent intermediate area 4 which acts as an optically active lens area 5. The electrodes 2, 3 act as driving plates of a driving means 15 to locally compress the intermediate layer 4 at specific circumferential areas in a controlled manner. In the herein shown embodiment the lens area 5 has a specific outer curvature and consists of two circular foil-like areas 14 made out of an optically transparent material and here enclosing a lens-shaped chamber 16. If appropriate the foil-like areas 14 may consist out of the same material as the intermediate layer 4. Depending on the field of application the lens-shaped chamber 16 may be filled with the same or a different material. Good results may be achieved with liquids, especially liquids having a higher refractive index. The intermediate layer 4 has in an undeformed state in the area of the electrodes 2, 3 a constant thickness B and is held, normally in a prestretched manner, in position in an opening 7 of an encompassing holding means (holding frame) 6. The electrodes 2, 3 are arranged opposite to each other on opposite sites of the intermediate layer 4 having an annular design. Further they are arranged equally distanced from the holding means 6. The intermediate layer 4 merges into the optically active lens area 5 arranged in the middle and concentrically with respect to the electrodes 2, 3 and holding frame 6. If appropriate other shapes of lenses and corresponding arrangements of electrodes are possible such as e.g. cylindrical lenses with laterally arranged electrodes. When a voltage V is applied (see FIGS. 28 and 29) between the electrodes 2, 3 the electrodes 2, 3 attract each other due to coulomb forces Fc such that the intermediate layer 4 is compressed between the electrodes 2, 3 in a first direction (x-direction) and which results in locally reduced thickness B'. Due to the poisson's ratio of the material of the intermediate layer 4 a lateral, in the shown embodiment rotation symmetric, expansion of the in between the electrodes 2, 3 compressed material occurs as indicated by arrows dr (here in radial direction). Which results in a radial herein rotation symmetric compression of the area of the intermediate layer 4 radially encompassed by the electrodes 2, 3 and the thereto interconnected lens area 5 such that the curvature/focus of the lens area 5 changes in a controlled manner (as indicated by arrows t) as a function of the voltage applied. The optical device can be made very small and therefore can be used in a wide range of applications, such as lens systems of mobile devices (mobile phone), digital cameras, illumination, such as lights of vehicles, projectors such as beamers, lenses of glasses. Depending on the field of application it is possible to integrate at least one optical element according to the present invention into a module comprising e.g. a CCD array for digital cameras or mobile devices.

To fill the lens shaped chamber 16 with a liquid, the border of the foil like area 14 can e.g. be supported by a frame and deformed by a vacuum. The deformed foil 14 can be filled with a liquid and in a consecutive step, the counter foil 14 is bonded to the first, liquid filled foil of the lens. Alternatively, the liquid can be incorporated into the foil-like areas 14 in a frozen state.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:
1. An optical active element comprising:
an intermediate layer made out of a deformable material and mechanically interconnected to a first and a second driving plate arranged in general opposite to each other on opposite sides of and partially covering the intermediate layer such that a local compression of the intermediate layer by the driving plates causes a local reduction of the thickness of the intermediate layer in a first direc- tion and at least one thereto by the poisson's ratio of the material of the intermediate layer related secondary deformation of the intermediate layer in a second direction whereby the secondary deformation causes a change in the optical behavior of the optical active area, wherein the intermediate layer is attached to a holding means in a prestretched manner such that the intermediate layer does not deform out of plane during operation.

2. The optical active element according to claim 1 wherein the first and the second driving plates are a first and a second electrode arranged such that when a voltage is applied between the first and the second electrode, the first and the second electrode attract each other due to coulomb forces.

3. The optical active element according to claim 2, wherein at least one of the electrodes consists of carbon black.

4. The optical active element according to claim 1 wherein the holding means has one of a circular and a square opening in which the intermediate layer is arranged.

5. The optical active element according to claim 2 wherein the electrodes are arranged laterally to the optical active area.

6. The optical active element according to claim 1 wherein the intermediate layer has a thickness in the range of 100 nm to 150 μm.

7. The optical active element according to claim 1 wherein the intermediate layer has a diameter in the range of 10 μm to 500 mm.

8. The optical active element according to claim 1 wherein an area of the intermediate layer not covered by the driving plates has an adjustable diameter which is related to the compression of the intermediate layer in the first direction by the poisson's ratio of the material.

9. The optical active element according to claim 8 wherein the area with the adjustable diameter comprises a diffraction grating with an adjustable grating period.

10. The optical active element according to claim 9 wherein the diffraction grating is a Fresnel-Lens.

11. The optical active element according to claim 9 wherein the diffraction grating comprises one of an injection molded, spin-coated, and stamped material.

12. The optical active element according to claim 1 wherein an optical active area of the intermediate layer not covered by the driving plates is transparent and has an adjustable thickness which is related to the compression of the intermediate layer in the first direction by the poisson's ratio of the material.

13. The optical active element according to claim 12 wherein the optical active area acts as phase shifting element.

14. The optical active element according to claim 12 wherein the optical active area acts as a lens having a variable focus.

15. An optical active element comprising:

an intermediate layer made out of a deformable material and mechanically interconnected to a first and a second driving plate arranged in general opposite to each other on opposite sides of and partially covering the intermediate layer such that a local compression of the intermediate layer by the driving plates causes a local reduction of the thickness of the intermediate layer in a first direction and at least one thereto by the poisson's ratio of the material of the intermediate layer related secondary deformation of the intermediate layer in a second direction whereby the secondary deformation causes a change in the optical behavior of the optical active area, wherein an optical active area of the intermediate layer not covered by the driving plates is transparent and has an adjustable thickness which is related to the compression of the intermediate layer in the first direction by the poisson's ratio of the material wherein the optical active area acts as a lens having a variable focus, and wherein the lens comprises a lens-shaped chamber (16) delimited by two foil-like areas (14).

16. The optical active element according to claim 15 wherein the lens-shaped chamber is filled with a material having a higher refractive index than the surrounding environment.

17. The optical active element according to claim 15 wherein the lens-shaped chamber is filled with a liquid.

18. The optical active element according to claim 9 wherein the diffraction grating is implemented in the surface of the intermediate layer or attached to the surface of the intermediate layer as a separate element.

19. A method for making of an optical element according to claim 1 comprising the following steps:

a) stretching the intermediate layer by 200% to 300% resulting in a prestretched intermediate layer;

b) attaching the prestretched intermediate layer to a holding means; and c) applying on each side of the intermediate layer an electrode at least partially covering the intermediate layer.

20. The method for making of the optical element according to claim 19 further comprising:

applying a grating to the intermediate layer.

21. The method for making the optical element according to claim 20, wherein the grating is made by one of spin coating, injection molding, and thermal forming.

22. The method according to claim 19 wherein the electrode consists of carbon black powder which is one of stamped, sprayed, coated, and printed.

* * * * *